US012802398B2

(12) United States Patent
Zou

(10) Patent No.: US 12,802,398 B2
(45) Date of Patent: Nov. 17, 2026

(54) FRAME TYPE DETERMINATION METHOD, DEVICE, EQUIPMENT AND STORAGE MEDIUM BASED ON LARGE MODEL

(71) Applicant: BEIJING BAIDU NETCOM SCIENCE TECHNOLOGY CO., LTD., Beijing (CN)

(72) Inventor: Jian Zou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 221 days.

(21) Appl. No.: 18/747,053

(22) Filed: Jun. 18, 2024

(65) Prior Publication Data

US 2025/0014313 A1 Jan. 9, 2025

(30) Foreign Application Priority Data

Dec. 12, 2023 (CN) ......................... 202311707614.9

(51) Int. Cl.
*G06K 9/68* (2006.01)
*G06V 10/44* (2022.01)
*G06V 10/74* (2022.01)
*G06V 10/764* (2022.01)
*H04N 19/159* (2014.01)

(52) U.S. Cl.
CPC ............ *G06V 10/761* (2022.01); *G06V 10/44* (2022.01); *G06V 10/764* (2022.01); *H04N 19/159* (2014.11)

(58) Field of Classification Search
CPC .... G06V 10/761; G06V 10/44; G06V 10/764; H04N 19/159; H04N 19/40; H04N 19/172
See application file for complete search history.

(56) References Cited

U.S. PATENT DOCUMENTS

2018/0082127 A1* 3/2018 Carlson ............... G06F 18/2323

FOREIGN PATENT DOCUMENTS

| | | | | | |
|---|---|---|---|---|---|
| CN | 115131709 A | * | 9/2022 | ........... | G06V 10/761 |
| CN | 116258748 A | * | 6/2023 | ............. | G06T 7/246 |
| WO | WO-2020177724 A1 | * | 9/2020 | ........... | H04N 9/8042 |

* cited by examiner

*Primary Examiner* — Xin Jia
(74) *Attorney, Agent, or Firm* — Osha Bergman Watanabe & Burton LLP

(57) ABSTRACT

A method for determining a frame type based on a large model, includes: obtaining a video frame sequence from video data; obtaining a feature of each video frame by performing image feature extraction on each of video frames in the video frame sequence; obtaining a feature similarity by comparing each video frame with an adjacent video frame in the video frame sequence; and determining a frame type of each video frame in the video frame sequence based on the feature similarity between each video frame and the adjacent video frame.

16 Claims, 7 Drawing Sheets

FRAME TYPE DETERMINATION METHOD, DEVICE, EQUIPMENT AND STORAGE MEDIUM BASED ON LARGE MODEL

TECHNICAL FIELD

The present disclosure relates to the field of artificial intelligence technology, in particular to the field of video compression processing, cloud computing technology, which may be applied to video encoding and transcoding processing in animation and game scenarios, and in particular relates to a method and an apparatus for determining a frame type based on a large model.

BACKGROUND

Video encoding and transcoding is a process of encoding and compression of raw video data for video storage, transmission and processing. A method for video encoding and transcoding selects intra-frame encoding or inter-frame encoding for a video frames based on a frame type of the video frame to achieve a purpose of reducing data amount and compressing video data.

Frame type decision is an important part of the process of video encoding and transcoding, which greatly affects a compression efficiency of the video encoding and transcoding.

SUMMARY

According to an aspect of the present disclosure, a method for determining a frame type based on a large model is provided. The method includes:

obtaining a video frame sequence from video data;

obtaining a feature of each video frame by performing image feature extraction on each of video frames in the video frame sequence;

obtaining a feature similarity by comparing each video frame with an adjacent video frame in the video frame sequence; and determining a frame type of each video frame in the video frame sequence based on the feature similarity between each video frame and the adjacent video frame.

According to another aspect of the present disclosure, a method of model training for determining a frame type is provided. The method includes:

obtaining a sample frame sequence, in which the sample frame sequence includes at least one sample frame, and the sample frame is labeled with a target frame type;

obtaining an image feature of each sample frame by performing an image feature extraction on each sample frame in the sample frame sequences;

obtaining a feature similarity by comparing each sample frame with an adjacent sample frame in the sample frame sequence;

determining a predicted frame type of each sample frame using a model based on the feature similarity between each sample frame and the adjacent sample frame;

training the model based on a difference between the target frame type and the predicted frame type.

According to another aspect of the present disclosure, an apparatus for determining a frame type based on a large model is provided. The apparatus includes: at least one processor; and a memory communicatively coupled to the at least one processor; in which the at least one processor is configured to:

obtain a video frame sequence from video data;

obtain a feature of each video frame by performing image feature extraction on each of video frames in the video frame sequence;

obtain a feature similarity by comparing each video frame with an adjacent video frame in the video frame sequence; and determine a frame type of each video frame in the video frame sequence based on the feature similarity between each video frame and the adjacent video frame.

It should be appreciated that description in this part is not intended to identify key or important features of embodiments of the present disclosure, and is not intended to limit the scope of the present disclosure. Other features of the present disclosure will be readily understood by the following specification.

BRIEF DESCRIPTION OF THE DRAWINGS

The accompanying drawings are used for a better understanding of the present embodiment and do not constitute a limitation of the present disclosure, in which.

DETAILED DESCRIPTION

Figure 1:
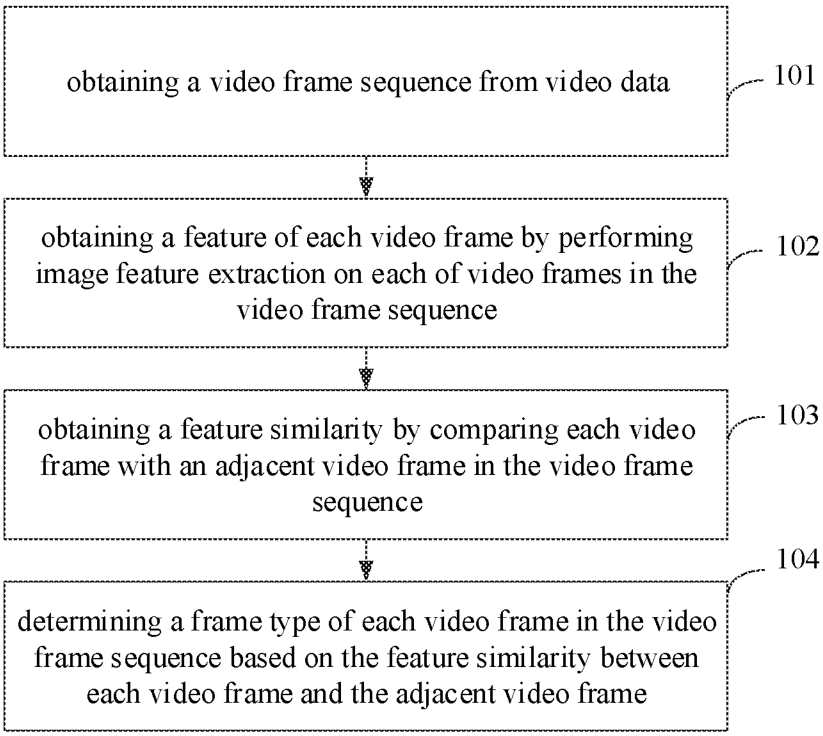
FIG. 1 is a flowchart illustrating a method for determining a frame type based on a large model according to an embodiment of the present disclosure.

Exemplary embodiments of the present disclosure are described hereinafter in conjunction with the accompanying drawings, which include various details of the embodiments of the present disclosure in order to aid in understanding, and which should be considered exemplary only. Accordingly, those ordinary skilled persons in the art should recognize that various changes and modifications can be made to embodiments described herein without departing from the scope and spirit of the present disclosure. Similarly, descriptions of well-known features and structures are omitted from the following description for the sake of clarity and brevity.

Frame type decision is an important part of a process of video encoding and transcoding, which greatly affects a compression efficiency of video encoding and transcoding. The frame types include: a key frame (I frame, also referred to as an inner code frame) and a forward predictive encoding frame (P frame), and in some scenarios, the frame types may also include a bidirectional predictive encoding frame (B frame).

A transmitted image frame may be categorized into the above three frame types on the basic of audio and video related standards. A first case is a first frame of image after a change of a scene, which is an independent image, transmitted through a method of point-by-point sampling with higher definition, and the image is also referred to as I frame. Information of the image is determined by itself without referring to other images. Data of the image represents a main content and a background content of the image.

A second case is an image that is separated from the I frame by a certain amount of time and a position of a main object of the image has changed significantly on the same background, and the image is also referred to as P frame. The image uses the previous I frame as reference, and transmit a difference of changes of the main object, without repetitive information such as the background, which omits part of detail information. During replay, full contents of the P frame may be recovered by relying on the frame memory to operate on the I frame and the transmitted difference, which is an actual image with both the background and a state of a present main object in motion.

A third case, which is similar to the P frame, is to transmit an image between the I frame and the P frame, also referred to as B frame. The image only reflects a change of the main object in motion between the I frame and the P frame, and represents a movement of the main object of the image with a displacement vector (or motion vector, etc.), which has a smaller amount of information. Because both the content of the I frame and the content of the P frame may be referred to when replaying the image, image is referred to as bidirectional prediction.

In general, the first frame after the change of the scene is the I frame and should be transmitted in full frame. In terms of a degree of compression, the I frame has the least amount of compression, followed by the P frame, and the B frame has the most compression. In order to increase a compression ratio, one P frame is usually set two frames (up to three frames) apart after the I frame, frames between the I frame and the P frame are both the B frames, and two to three B frames may be set between two P frames.

The number of interval frames between two I frames is smaller as the content of the main object changes more, and the number of interval frames between two I frames can be appropriately larger as the content of the main object changes less. In other words, the larger a proportion of B frame and P frame, the higher a compression ratio of the image. In general, two I frames are separated by 13~15 frames, and the number of interval frames should not be more.

To determine whether a frame of image is an I frame, a P frame, or a B frame, in a traditional method of encoding and transcoding, it is required to perform cost calculation on different combinations of frame types to find out one combination of frame types that is most suitable for encoding. This process has a huge amount of computation and does not necessarily find the optimal combination of frame types.

In embodiments of the present disclosure, a video frame sequence from video data is obtained, after obtaining a feature of each video frame by performing image feature extraction on each of video frames in the video frame sequence, a feature similarity is obtained by comparing each video frame with an adjacent video frame in the video frame sequence, and a frame type of each video frame in the video frame sequence is determined based on the feature similarity between each video frame and the adjacent video frame. Thus, recognition of frame types is realized.

FIG. 1 is a flowchart illustrating a method for determining a frame type based on a large model according to an embodiment of the present disclosure. As shown in FIG. 1, the method includes following steps S101 to S104.

At step 101, a video frame sequence from video data is obtained.

Alternatively, the video frame sequence is obtained by selecting a plurality of consecutive video frames from video data to be encoded, and sorting the plurality of consecutive video frames in a display order. The specific method of selecting the plurality of consecutive video frames from the video data to be encoded may be realized by reading a video file frame by frame.

In some possible implementations, the video frame sequence may be intercepted randomly, or according to a fixed number of frames.

In some other possible implementations, key frame recognition may be performed based on the content of the image, and video frames between two key frames is used as the video frame sequence, i.e., a first frame in the video frame sequence is the key frame, and a last frame in the video frame sequence is a frame before the next key frame.

At step 102, a feature of each video frame is obtained by performing image feature extraction on each of video frames in the video frame sequence.

Alternatively, the image feature extraction is performed on each video frame in the video frame sequence to obtain a feature describing a profile and details of the video frame.

The method for performing the image feature extraction may adopt a method of classical feature extraction of an image, for example, histogram of oriented gradient (HOG), scale-invariant features transform (SIFT), speeded up robust features (SURF, an improvement of SIFT), difference of Gaussian (DOG), local binary pattern (LBP), haar-like features (HAAR, haar is a person's name, haar proposed a wavelet used as a filter, and the filter is named as a haar filter, and later someone used the filter on the image, this is the haar feature of the image), or may also adopt a method of general feature extraction for an image, such as a grayscale histogram, a color histogram; or may also adopt a method for performing feature extraction based on a deep neural network, which is not limited in this embodiment.

At step 103, a feature similarity is obtained by comparing each video frame with an adjacent video frame in the video frame sequence.

For each video frame, the video frame is compared to the adjacent video in the video sequence to determine the feature similarity between the video frame and the adjacent video frame. The feature similarity describes a degree of association between the feature of the video frame and the feature of the adjacent video frame.

As a possible implementation, each video frame may be compared to a previous adjacent video frame in the video sequence to determine a difference between a current video frame and the previous adjacent video frame.

As another possible implementation, each video frame may be compared to both a previous adjacent video frame and a next adjacent video frame in the video sequence to determine a difference between a current video frame and the previous adjacent video frame, and a difference between the current video frame and the next adjacent video frame.

At step 104, a frame type of each video frame in the video frame sequence is determined based on the feature similarity between each video frame and the adjacent video frame.

Alternatively, since the feature similarity between the video frame and the adjacent video frame is different for different frame types, the frame type of each video frame in the video frame sequence may be determined based on the feature similarity.

As a possible implementation, the frame type of the video frame may be determined based on the feature similarity corresponding to the single video frame in the video frame sequence. In other words, the determination is based only on the feature similarity corresponding to the single video frame, without considering the feature similarities corresponding to other video frames in the video frame sequence.

As another possible realization, the frame type of the video frame may be determined based on a change rule of the feature similarity of each video frame in the video frame sequence, and the feature similarity corresponding to the current video frame. In other words, the determination is not only based on the feature similarity corresponding to the single video frame, but also need to consider the feature similarity corresponding to other video frame in the video frame sequence.

In an embodiment of the present disclosure, the video frame sequence from video data is obtained, after obtaining the feature of each video frame by performing the image feature extraction on each of the video frames in the video frame sequence, the feature similarity is obtained by comparing each video frame with the adjacent video frame in the video frame sequence, and the frame type of each video frame in the video frame sequence is determined based on the feature similarity between each video frame and the adjacent video frame. Thus, recognition of frame types is realized. Since the feature similarity between the video frame and the adjacent video frame may reflect content relevance between each video frame and the adjacent video frame, the recognizing the frame type based on the feature similarity may more accurately recognize the frame type of each video frame.

Figure 2:
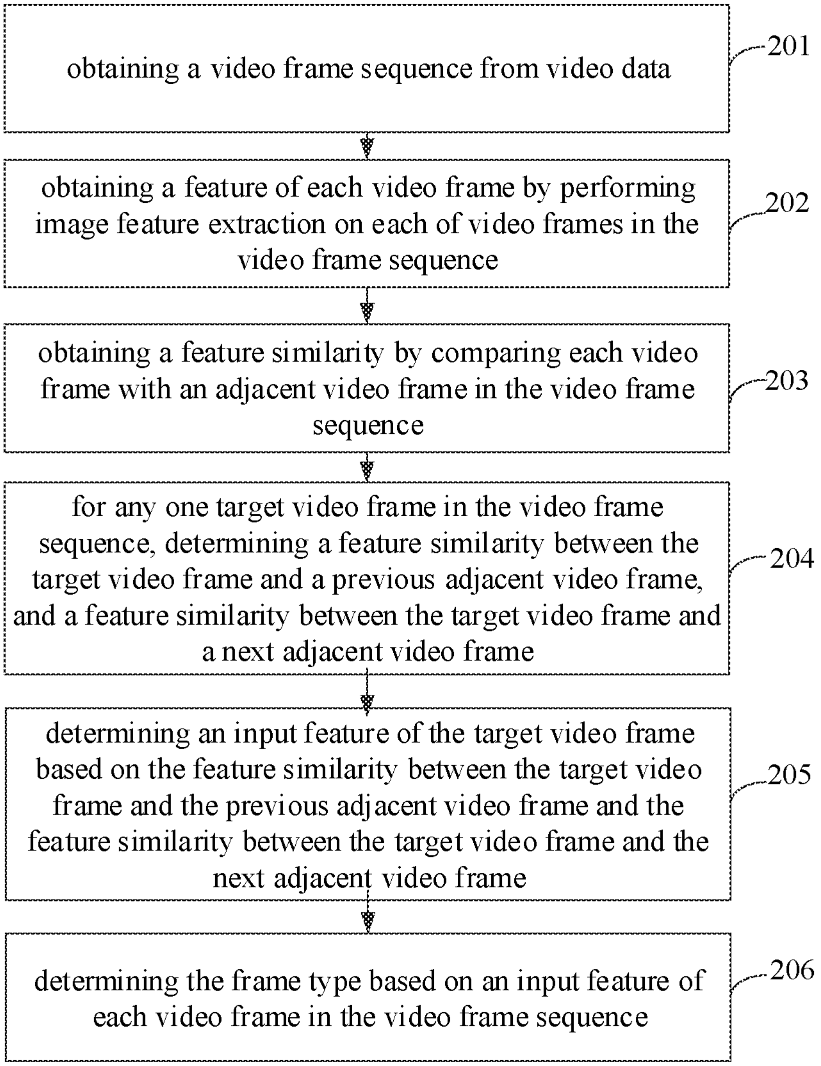
FIG. 2 is a flowchart illustrating another method for determining a frame type based on a large model according to an embodiment of the present disclosure.

FIG. 2 is a flowchart illustrating another method for determining a frame type based on a large model according to an embodiment of the present disclosure. As shown in FIG. 2, the method includes following steps S201 to S206.

At step 201, a video frame sequence from video data is obtained.

At step 202, a feature of each video frame is obtained by performing image feature extraction on each of video frames in the video frame sequence.

At step 203, a feature similarity is obtained by comparing each video frame with an adjacent video frame in the video frame sequence.

The step 201 to step 203 refer to the step 101 to step 103 in the foregoing embodiment, which will not be repeated in this embodiment.

At step 204, for any one target video frame in the video frame sequence, a feature similarity between the target video frame and a previous adjacent video frame, and a feature similarity between the target video frame and a next adjacent video frame, are determined.

The feature similarity may be a distance between features of the video frames, which may be characterized, for example, by a Euclidean distance in a feature space. It may be indicated that, the closer the distance, the more similar the features are to each other, and the further the distance, the greater the difference between the features. Since in some frame types, the content of a forward video frame and a backward video frame need to be combined for encoding, in this step, both considering the similarity between the target video frame and the previous adjacent video frame and the similarity between the target video frame and the next adjacent video frame may reflect the content correlation with the forward video frame and the backward video frame more completely, and help to improve an accuracy of recognizing the frame type.

At step 205, an input feature of the target video frame is determined based on the feature similarity between the target video frame and the previous adjacent video frame and the feature similarity between the target video frame and the next adjacent video frame.

Alternatively, the feature similarity between the target video frame and the previous adjacent video frame is taken as a first component; the feature similarity between the target video frame and the next adjacent video frame is taken as a second component; and the input feature of the target video frame is obtained by splicing the first component and the second component. The feature similarity between the target video frame and the previous adjacent video frame and the feature similarity between the target video frame and the next adjacent video frame are spliced and taken as the input feature. Thus, the input feature carries these two feature similarities, which enriches data connotation of the input feature, and helps to improve a determination accuracy when the frame type determination is performed in the subsequent period.

At step 206, the frame type is determined based on an input feature of each video frame in the video frame sequence As a possible implementation, for any one target video frame in the video frame sequence, a frame type of the target video frame is determined based on a classification result of a classification model, by inputting the input feature of the target video frame into the classification model. The frame type of the video frame may be determined by the classification model based on the feature similarity corresponding to a single video frame in the video frame sequence. In other words, the determination is based only on the feature similarity corresponding to the single video frame, without considering the feature similarities corresponding to other video frames in the video frame sequence, which has a simpler process.

As another possible implementation, a frame type of each video frame in the video frame sequence is determined based on an output of an encoding and decoding model, by inputting the input feature of each video frame in the video frame sequence into the encoding and decoding model. The frame type of the video frame may be determined by the encoding and decoding model based on a change rule of the feature similarity of each video frame in the video frame sequence, and the feature similarity corresponding to the current video frame. In other words, considering not only the feature similarity corresponding to the single video frame, but also the feature similarities corresponding to other video frames in the video frame sequence may further improve an accuracy of determining the frame type.

Further, for any one target video frame in the video frame sequence, the target video frame is encoded by using a method for intra-frame encoding, in a case that the frame type of the target video frame is the key frame. The target video frame is encoded based on a most recent key frame previous to the target video frame, in a case that the frame type of the target video frame is the forward predictive encoding frame. Quality of an encoded code stream is improved at an encoding process by accurate recognition of the key frames and the forward predictive encoding frame.

In some scenarios, the frame type further includes a bidirectional predictive encoded frame. On the basic of this, the target video frame may be encoded based on the most recent key frame previous to the target video frame and a most recent forward predictive encoded frame next to the target video frame, in a case that the frame type of the target video frame is the bidirectional predictive encoding frame; or, the target video frame may be encoded based on a most recent forward predictive encoded frame previous to the target video frame and the most recent forward predictive encoded frame next to the target video frame, in the case that the frame type of the target video frame is the bidirectional predictive encoding frame. Thus, the quality of the encoded code stream is improved.

It is noted that the model in an embodiment may be based on a plurality of model parameters, which may also be referred to as a large model.

In an embodiment of the present disclosure, the video frame sequence from video data is obtained, after obtaining the feature of each video frame by performing the image feature extraction on each of the video frames in the video frame sequence, the feature similarity is obtained by comparing each video frame with the adjacent video frame in the video frame sequence, and the frame type of each video frame in the video frame sequence is determined based on the feature similarity between each video frame and the adjacent video frame. Thus, recognition of frame types is realized. Since the feature similarity between the video frame and the adjacent video frame may reflect content relevance between each video frame and the adjacent video frame, the recognizing the frame type based on the feature similarity may more accurately recognize the frame type of each video frame.

Figure 3:
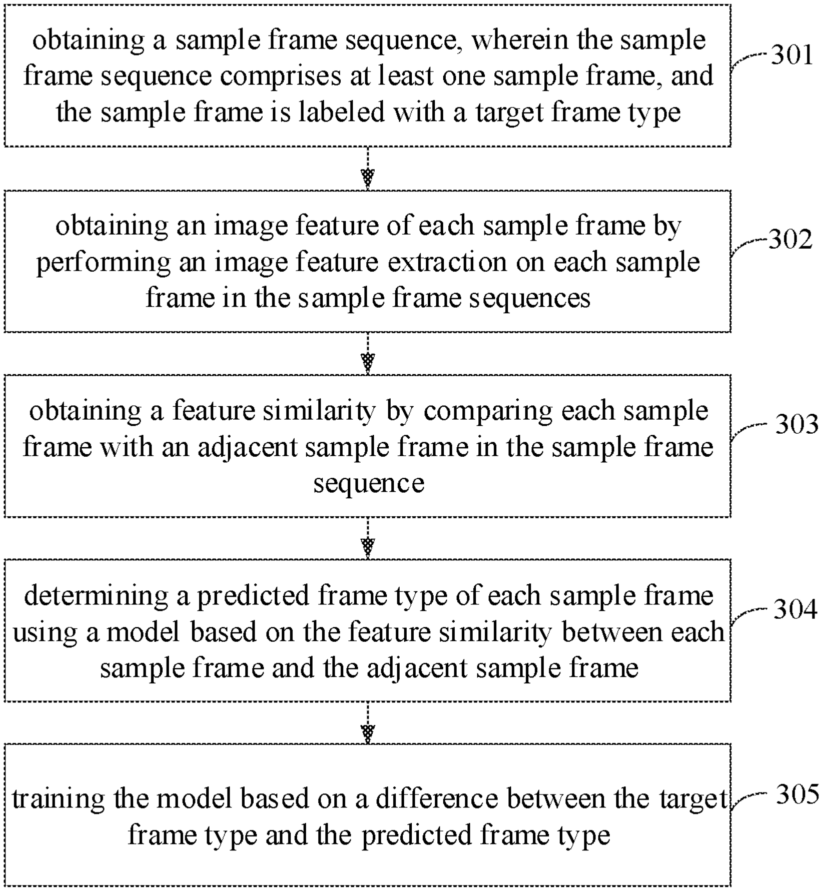
FIG. 3 is a flowchart illustrating a method of model training for determining a frame type according to an embodiment of the present disclosure.

FIG. 3 is a flowchart illustrating a method of model training for determining a frame type according to an embodiment of the present disclosure. A model in an embodiment of the present disclosure may be a neural network based on a plurality of model parameters, which may also be referred to as a large model. As shown in FIG. 3, the method includes following steps S301 to S305.

At step 301, a sample frame sequence is obtained, in which the sample frame sequence includes at least one sample frame, and the sample frame is labeled with a target frame type.

Alternatively, a large amount of video data is acquired to be used as a training sample for the model. The video data may come from a variety of sources, such as publicly available video databases, video websites, personal filming, etc. During acquiring the video data, considering parameters, such a resolution, a frame rate, etc. of the video as diverse as possible, it is ensured that the acquired video data can cover the video characteristics in various practical application scenarios. After the video data is acquired, each frame is extracted from the video data as a sample frame, and each frame is labeled with a frame type, and the frame type labeled for the sample frame is referred to as the target frame type. In some possible implementations, frame extraction may be achieved by reading a video file frame by frame, while it is required to label each frame, to indicate the frame type to which the frame belongs (e.g., I-frame, P-frame, B-frame, etc.).

Further, after completing preparation of the sample frame sequence, a data set composed by all the sample frame sequences needs to be divided into three parts: a training set, a validation set, and a test set. Typically, the data set may be divided in a proportion of 80%:10%:10%, in which the training set is configured to training of the model, the validation set is configured to selection and adjustment of model parameters, and the test set is configured to evaluation and validation of the model.

At step 302, an image feature of each sample frame is obtained by performing an image feature extraction on each sample frame in the sample frame sequences.

The image feature extraction is performed on each sample frame sequence to obtain a feature describing a profile and details of the video frame. The method for performing the image feature extraction may adopt a method of classical feature extraction of an image, or may also adopt a method of general feature extraction for an image, such as a grayscale histogram, a color histogram; or may also adopt a method for performing feature extraction based on a deep neural network, which is not limited in this embodiment.

At step 303, a feature similarity is obtained by comparing each sample frame with an adjacent sample frame in the sample frame sequence.

For each sample frame, that sample frame is compared to the adjacent sample frame in the sample sequence to determine the feature similarity between the sample frame and the adjacent sample frame. The feature similarity describes a degree of association between the feature of the sample frame and the feature of the adjacent sample frame.

As a possible implementation, each sample frame may be compared to a previous adjacent sample frame in the sample sequence to determine a difference between a current sample frame and the previous adjacent sample frame.

As another possible implementation, each sample frame may be compared to both a previous adjacent sample frame and a next adjacent sample frame in the sample sequence to determine a difference between a current sample frame and the previous adjacent sample frame, and a difference between the current sample frame and the next adjacent sample frame.

At step 304, a predicted frame type of each sample frame is determined using a model based on the feature similarity between each sample frame and the adjacent sample frame.

Alternatively, since the feature similarity between each sample frame and the adjacent sample frame is different for different frame types, the predicted frame type of each sample frame in the sample frame sequence may be determined based on such feature similarity. In this case, the predicted frame type is a frame type determined by the model, which is easily distinguishable from the target frame type labeled by the sample frame.

As a possible implementation, the frame type of a single sample frame in the sample frame sequence may be determined based on the feature similarity corresponding to the single sample frame in the sample frame sequence. In other words, the determination is based only on the feature similarity corresponding to the single sample frame, without considering the feature similarities corresponding to other sample frames in the sample frame sequence.

As another possible realization, the frame type of a sample frame may be determined based on a change rule of the feature similarity of each sample frame in the sample frame sequence, and the feature similarity corresponding to the current sample frame. In other words, the determination is not only based on the feature similarity corresponding to the single sample frame, but also need to consider the feature similarity corresponding to other sample frame in the sample frame sequence.

At step 305, the model is trained based on a difference between the target frame type and the predicted frame type.

Alternatively, during the training process, a suitable optimization algorithm and a loss function need to be selected to update the model parameter and evaluate a performance of the model. In which, the loss function is configured to indicate the difference between the target frame type and the predicted frame type.

In addition, the model needs to be optimized, including adjusting a structure, the parameter, and hyperparameter of the model, etc., to obtain optimal training effect and accuracy.

Further, after completing the training of the model, the model may also be evaluated and tested using the validation set and the test set described above. For example, the model may be evaluated using the validation set to calculate accuracy, precision, recall, and other metrics of the model. In a case that the performance of the model is insufficient or has problems such as overfitting, the model needs to be further optimized or re-trained. In addition, the model may be tested using the test set to verify the performance and the application effect of the model in practical scenarios.

After completing the evaluation and testing of the model, the model may be deployed to a practical application scenario. The model may be transformed into specific engineering applications using various development tools and frameworks, and perform decision and processing of video frame types in real time. Compared with related art, the method of the present disclosure directly obtains a result of frame type decision output from the model, no longer performs a complex computational process of pre-analyzed frame type decision. The result is utilized for an actual encoding and transcoding process.

In an embodiment of the present disclosure, by training the model, it may perform that a video frame sequence from video data is obtained, after obtaining a feature of each video frame by performing image feature extraction on each of video frames in the video frame sequence, a feature similarity is obtained by comparing each video frame with an adjacent video frame in the video frame sequence, and a frame type of each video frame in the video frame sequence is determined by the trained model based on the feature similarity between each video frame and the adjacent video frame. Thus, recognition of frame types is realized.

Since the feature similarity between the video frame and the adjacent video frame may reflect content relevance between each video frame and the adjacent video frame, the recognizing the frame type based on the feature similarity may more accurately recognize the frame type of each video frame.

Figure 4:
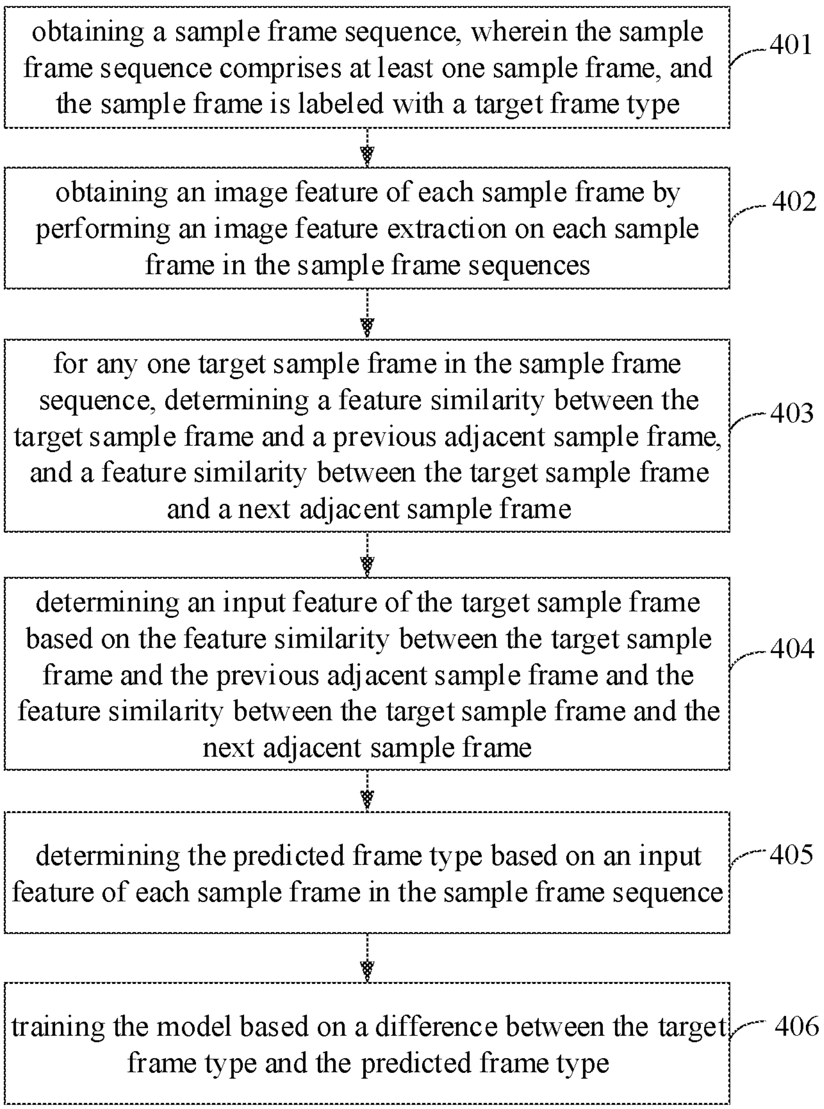
FIG. 4 is a flowchart illustrating another method of model training for determining a frame type according to an embodiment of the present disclosure.

FIG. 4 is a flowchart illustrating another method of model training for determining a frame type according to an embodiment of the present disclosure. As shown in FIG. 4, the method includes following steps S401 to S406.

At step 401, a sample frame sequence is obtained, in which the sample frame sequence includes at least one sample frame, and the sample frame is labeled with a target frame type.

At step 402, an image feature of each sample frame is obtained by performing an image feature extraction on each sample frame in the sample frame sequences.

At step 403, for any one target sample frame in the sample frame sequence, a feature similarity between the target sample frame and a previous adjacent sample frame, and a feature similarity between the target sample frame and a next adjacent sample frame are determined.

At step 404, an input feature of the target sample frame is determined based on the feature similarity between the target sample frame and the previous adjacent sample frame and the feature similarity between the target sample frame and the next adjacent sample frame.

Alternatively, the feature similarity between the target sample frame and the previous adjacent sample frame is taken as a first component; the feature similarity between the target sample frame and the next adjacent sample frame is taken as a second component; and the input feature of the target sample frame is obtained by splicing the first component and the second component.

At step 405, the predicted frame type is determined based on an input feature of each sample frame in the sample frame sequence.

As a possible implementation, for any one target sample frame in the sample frame sequence, the predicted frame type of the target sample frame is determined based on a classification result of a classification model by inputting the input feature of the target sample frame into the classification model.

As another possible implementation, the predicted frame type of each sample frame in the sample frame sequence is determined based on an output of an encoding and decoding model, by inputting the input feature of each sample frame in the sample frame sequence into the encoding and decoding model.

At step 406, the model is trained based on a difference between the target frame type and the predicted frame type.

Figure 5:
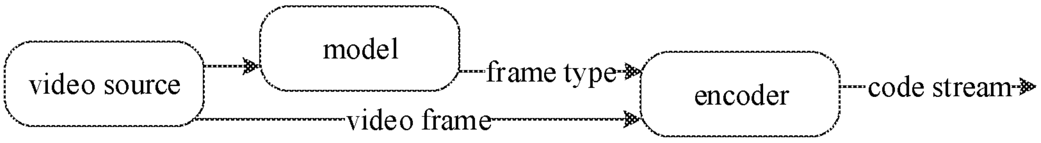
FIG. 5 is a schematic diagram illustrating a process of encoding and transcoding.

After training the model by the method provided in this embodiment, determining the frame type may be performed by adopting the trained model, and then the encoding and transcoding process may be performed as in FIG. 5, which is a schematic diagram illustrating a process of encoding and transcoding.

As shown in FIG. 5, an output of a video source is video data to be encoded. The output video data to be encoded which is output from the video source is fed to the trained model via one way and to an encoder via the other way.

A frame type set is obtained by performing a frame type decision on each video frame in the video data by the trained model. The frame type of each video frame is recorded in the frame type set. The encoder, based on the frame type of each video frame, encodes the video frame corresponding to the video data provided by the video source, thus obtaining encoded code stream of the video data. The process of encoding and transcoding as shown in FIG. 5 may be performed by a resource server in cloud to send the code stream in FIG. 5 to a client.

In an embodiment of the present disclosure, by training the model, it may perform that a video frame sequence from video data is obtained, after obtaining a feature of each video frame by performing image feature extraction on each of video frames in the video frame sequence, a feature similarity is obtained by comparing each video frame with an adjacent video frame in the video frame sequence, and a frame type of each video frame in the video frame sequence is determined by the trained model based on the feature similarity between each video frame and the adjacent video frame. Thus, recognition of frame types is realized.

Since the feature similarity between the video frame and the adjacent video frame may reflect content relevance between each video frame and the adjacent video frame, the recognizing the frame type based on the feature similarity may more accurately recognize the frame type of each video frame.

Figure 6:
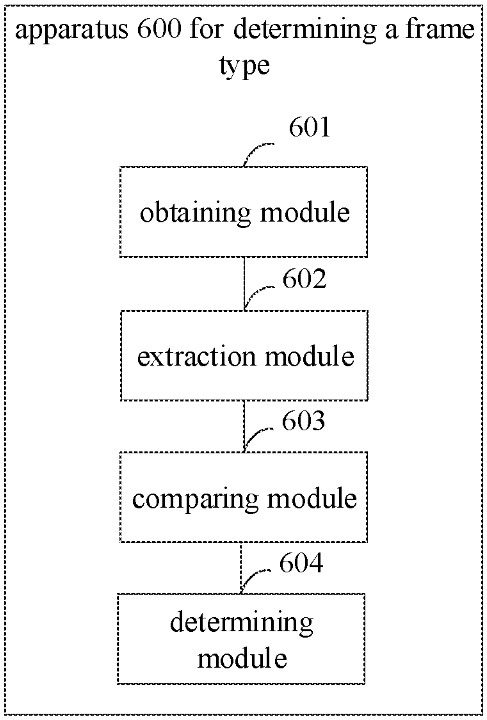
FIG. 6 is a schematic diagram illustrating an architecture of an apparatus 600 for determining a frame type based on a large model according to an embodiment of the present disclosure.

FIG. 6 is a diagram illustrating an architecture of an apparatus 600 for determining a frame type based on a large model according to an embodiment of the present disclosure. The apparatus 600 includes an obtaining module 601, an extraction module 602, a comparing module 603, and a determining module 604.

The obtaining module 601 is configured to obtain a video frame sequence from video data.

The extraction module 602 is configured to obtain a feature of each video frame by performing image feature extraction on each of video frames in the video frame sequence.

The comparing module 603 is configured to obtain a feature similarity by comparing each video frame with an adjacent video frame in the video frame sequence.

The determining module 604 is configured to determine a frame type of each video frame in the video frame sequence based on the feature similarity between each video frame and the adjacent video frame.

Alternatively, the determining module 604 is configured to: for any one target video frame in the video frame sequence, determine a feature similarity between the target video frame and a previous adjacent video frame, and a feature similarity between the target video frame and a next adjacent video frame; determine an input feature of the target video frame based on the feature similarity between the target video frame and the previous adjacent video frame and the feature similarity between the target video frame and the next adjacent video frame; and determine the frame type based on an input feature of each video frame in the video frame sequence.

Alternatively, the determining module 604 is configured to: take the feature similarity between the target video frame and the previous adjacent video frame as a first component; take the feature similarity between the target video frame and the next adjacent video frame as a second component; and obtain the input feature of the target video frame by splicing the first component and the second component.

Alternatively, the determining module 604 is configured to: for any one target video frame in the video frame sequence, determine a frame type of the target video frame based on a classification result of a classification model by inputting the input feature of the target video frame into the classification model.

Alternatively, the determining module 604 is configured to: determine a frame type of each video frame in the video frame sequence based on an output of an encoding and decoding model, by inputting the input feature of each video frame in the video frame sequence into the encoding and decoding model.

Alternatively, the frame type includes a key frame and a forward predictive encoded frame, and the apparatus further including an encoding module, configured to: for any one target video frame in the video frame sequence, encode the target video frame by using a method for intra-frame encoding, in a case that the frame type of the target video frame is the key frame; and encode the target video frame based on a most recent key frame previous to the target video frame, in a case that the frame type of the target video frame is the forward predictive encoding frame.

Alternatively, the frame type further includes a bidirectional predictive encoded frame, the encoding module is further configured to:

- encode the target video frame based on the most recent key frame previous to the target video frame and a most recent forward predictive encoded frame next to the target video frame, in a case that the frame type of the target video frame is the bidirectional predictive encoding frame; or,
- encode the target video frame based on a most recent forward predictive encoded frame previous to the target video frame and the most recent forward predictive encoded frame next to the target video frame, in the case that the frame type of the target video frame is the bidirectional predictive encoding frame.

In an embodiment of the present disclosure, the video frame sequence from video data is obtained, after obtaining the feature of each video frame by performing the image feature extraction on each of the video frames in the video frame sequence, the feature similarity is obtained by comparing each video frame with the adjacent video frame in the video frame sequence, and the frame type of each video frame in the video frame sequence is determined based on the feature similarity between each video frame and the adjacent video frame. Thus, recognition of frame types is realized. Since the feature similarity between the video frame and the adjacent video frame may reflect content relevance between each video frame and the adjacent video frame, the recognizing the frame type based on the feature similarity may more accurately recognize the frame type of each video frame.

Figure 7:
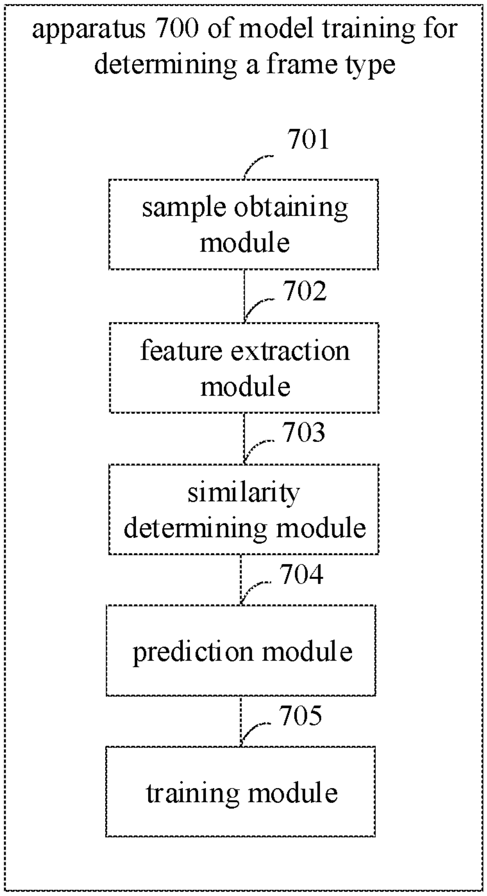
FIG. 7 is a schematic diagram illustrating an architecture of an apparatus 700 of model training for determining a frame type according to an embodiment of the present disclosure.

FIG. 7 is a diagram illustrating an architecture of an apparatus 700 of model training for determining a frame type according to an embodiment of the present disclosure. The apparatus 700 including a sample obtaining module 701, a feature extraction module 702, a similarity determining module 703, a prediction module 704, and a training module 705.

The sample obtaining module 701 is configured to obtain a sample frame sequence, in which the sample frame sequence includes at least one sample frame, and the sample frame is labeled with a target frame type.

The feature extraction module 702 is configured to obtain an image feature of each sample frame by performing an image feature extraction on each sample frame in the sample frame sequences.

The similarity determining module 703 is configured to obtain a feature similarity by comparing each sample frame with an adjacent sample frame in the sample frame sequence.

The prediction module 704 is configured to determine a predicted frame type of each sample frame using a model based on the feature similarity between each sample frame and the adjacent sample frame.

The training module 705 is configured to train the model based on a difference between the target frame type and the predicted frame type.

Alternatively, the prediction module 704 is configured to: for any one target sample frame in the sample frame sequence, determine a feature similarity between the target sample frame and a previous adjacent sample frame, and a feature similarity between the target sample frame and a next adjacent sample frame; determine an input feature of the target sample frame based on the feature similarity between the target sample frame and the previous adjacent sample frame and the feature similarity between the target sample frame and the next adjacent sample frame; determine the predicted frame type based on an input feature of each sample frame in the sample frame sequence.

Alternatively, the prediction module 704, is configured to:

- for any one target sample frame in the sample frame sequence, determine the predicted frame type of the target sample frame based on a classification result of a classification model by inputting the input feature of the target sample frame into the classification model.

Or, alternatively, the prediction module 704, is configured to:

- determine the predicted frame type of each sample frame in the sample frame sequence based on an output of an encoding and decoding model, by inputting the input feature of each sample frame in the sample frame sequence into the encoding and decoding model.

In an embodiment of the present disclosure, by training the model, it may perform that a video frame sequence from video data is obtained, after obtaining a feature of each video frame by performing image feature extraction on each of video frames in the video frame sequence, a feature similarity is obtained by comparing each video frame with an adjacent video frame in the video frame sequence, and a frame type of each video frame in the video frame sequence is determined by the trained model based on the feature similarity between each video frame and the adjacent video frame. Thus, recognition of frame types is realized. Since the feature similarity between the video frame and the adjacent video frame may reflect content relevance between each video frame and the adjacent video frame, the recognizing the frame type based on the feature similarity may more accurately recognize the frame type of each video frame.

According to embodiments of the present disclosure, an electronic device, a readable storage medium, and a computer program product are also provided.

Figure 8:
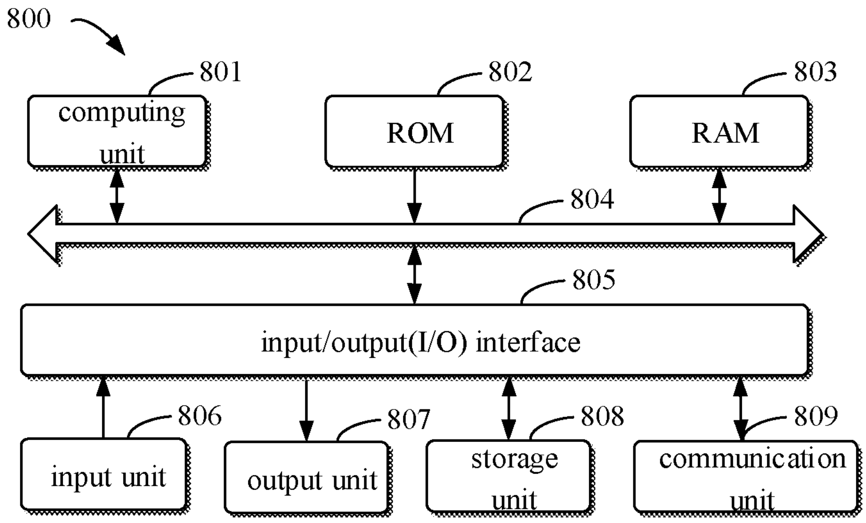
FIG. 8 is a block diagram illustrating an electronic device 800 according to an embodiment of the present disclosure.

Referring to FIG. 8, which is a block diagram illustrating an electronic device 800 according to an embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable non-intrusive flexible loads aggregation characteristic identification devices, and other similar computing devices. The components shown herein, their connections and relations, and their functions are merely examples, and are not intended to limit the implementation of the disclosure described and/or required herein.

As shown in FIG. 8, the device 800 includes a computing unit 801, configured to execute various appropriate actions and processes according to a computer program stored in a read-only memory (ROM) 802 or loaded from a storage unit 808 to a random access memory (RAM) 803. In the RAM 803, various programs and data required for the device 800 may be stored. The computing unit 801, the ROM 802 and the RAM 803 may be connected with each other by a bus 804. An input/output(I/O) interface 805 is also connected to the bus 804.

The device 800 are connected to an I/O interface 805, and includes: an input unit 806, for example, a keyboard, a mouse; an output unit 807, for example, various types of displays, speakers; a storage unit 808, for example, a magnetic disk, an optical disk; and a communication unit 809, for example, a network card, a modem, a wireless transceiver. The communication unit 809 allows the device 800 to exchange information/data through a computer network such as internet and/or various types of telecommunication networks and other devices.

The computing unit 801 may be various types of general and/or dedicated processing components with processing and computing ability. Some examples of a computing unit 801 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 801 executes various methods and processes as described above, for example, a method for determining a frame type, and a method of model training for determining a frame type. For example, in some embodiments, the method for determining a frame type, and the method of model training for determining a frame type may be further implemented as a computer software program, which is physically contained in a machine readable medium, such as the storage unit 808. In some embodiments, a part or all of the computer program may be loaded and/or installed on the device 800 via the ROM 802 and/or a communication unit 809. When the computer program is loaded on the RAM 803 and executed by the computing unit 801, one or more steps in the method described above may be performed. Alternatively, in other embodiments, the computing unit 801 may be configured to the method in the embodiment described above in other appropriate ways (for example, by virtue of a firmware).

In context, various implementation modes of systems and technologies as described above may be implemented in a digital electronic circuit system, an integrated circuit system, a field programmable gate array(FPGA), a dedicated application specific integrated circuit (ASIC), a system on a chip (SOC), a complex programmable logic device (CPLD), a computer hardware, a firmware, a software, and/or combinations thereof. The implementations may include: implemented in one or more computer programs. The one or more computer programs may be executed and/or interpreted on a programmable system including at least one programmable processor. The programmable processor may be a dedicated or general-purpose programmable processor, may receive data and instructions from a storage system, at least one input device, and at least one output device, and transmit the data and the instructions to the storage system, the at least one input device, and the at least one output device.

Program codes configured to execute a method in the present disclosure may be written with one or any combination of multiple programming languages. These program codes may be provided to a processor or a controller of a general-purpose computer, a dedicated computer, or other programmable apparatuses for data processing so that the function/operation specified in the flowchart and/or block diagram may be implemented when the program codes are executed by the processor or controller. The computer codes may be executed completely or partly on the machine, as an independent software package, executed partly on the machine and executed partly on the remote machine, or executed completely on the remote machine or server.

In the context of the present disclosure, a machine-readable medium may be a tangible medium that may contain or store a program intended for use in or in conjunction with an instruction execution system, an apparatus or a device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a compact disc read-only memory (CD-ROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input or a tactile input).

Systems and technologies described herein may be implemented in a computing system (for example, as a data server) including a background component, or a computing system (for example, an application server) including a middleware component, or a computing system including a front-end component (for example, a user computer with a graphical user interface or a web browser, and the user may interact with implementations of the systems and technologies described herein via the graphical user interface or the web browser), or in a computing system including any combination of the background component, the middleware component, or the front-end component. Components of the system may be interconnected by any form or medium of digital data communication (for example, a communication network). Examples of the communication network include a local area network (LAN), a wide area network (WAN), an Internet, and a blockchain network.

The computer system may include a client and a server. The client and the server are generally far away from each other and generally interact with each other through a communication network. A relationship between the client and the server is generated by computer programs that run on the corresponding computer and have a client-server relationship with each other. A server may be a cloud server, also referred to as a cloud computing server or a cloud host, which is a host product in a cloud computing service system to solve problems of difficult management and weak business scalability in a traditional physical host and a VPS service (virtual private server, or VPS for short). The server may also be a server of a distributed system, or a server in combination with a blockchain.

It should be noted that artificial intelligence is a subject for studying using computers to simulate certain thought processes and intelligent behaviors (such as learning, reasoning, thinking and planning) of humans, which involves both hardware-level technologies and software-level technologies. The hardware technologies for the artificial intelligence generally includes technologies such as sensors, dedicated artificial intelligence chips, cloud computing, distributed storage, big data processing. The software technologies for the artificial intelligence mainly includes computer vision technology, speech recognition technology, natural language processing technology, as well as machine learning/deep learning, big data processing technology, knowledge mapping technology and other major directions.

It should be noted that various forms of processes shown above may be used to reorder, add, or delete steps. For example, steps described in the present disclosure may be executed in parallel, sequentially, or in a different order, as long as the desired result of the technical solution disclosed in the present disclosure may be achieved, which will not be limited herein.

The above specific implementations do not constitute a limitation of the protection scope of the disclosure. Those skilled in the art shall understand that various modifications, combinations and sub-combinations and substitutions may be made according to design requirements and other factors. Any modification, equivalent substitution and improvement, etc., made within the spirit and principle of the present disclosure shall be included within the protection scope of the present.

The invention claimed is:

1. A method for determining a frame type based on a large model, comprising:

obtaining a video frame sequence from video data;

obtaining a feature of each video frame by performing image feature extraction on each of video frames in the video frame sequence;

obtaining a feature similarity by comparing each video frame with an adjacent video frame in the video frame sequence; and determining a frame type of each video frame in the video frame sequence based on the feature similarity between each video frame and the adjacent video frame;

wherein determining the frame type of each video frame in the video frame sequence based on the feature similarity between each video frame and the adjacent video frame comprises:

for any one target video frame in the video frame sequence, determining a feature similarity between the target video frame and a previous adjacent video frame, and a feature similarity between the target video frame and a next adjacent video frame;

determining an input feature of the target video frame based on the feature similarity between the target video frame and the previous adjacent video frame and the feature similarity between the target video frame and the next adjacent video frame; and determining the frame type based on an input feature of each video frame in the video frame sequence.

2. The method according to claim 1, wherein determining the input feature of the target video frame based on the feature similarity between the target video frame and the previous adjacent video frame and the feature similarity between the target video frame and the next adjacent video frame comprises:

taking the feature similarity between the target video frame and the previous adjacent video frame as a first component;

taking the feature similarity between the target video frame and the next adjacent video frame as a second component; and obtaining the input feature of the target video frame by splicing the first component and the second component.

3. The method according to claim 1, wherein determining the frame type based on the input feature of each video frame in the video frame sequence comprises:

for any one target video frame in the video frame sequence, determining a frame type of the target video frame based on a classification result of a classification model by inputting the input feature of the target video frame into the classification model.

4. The method according to claim 1, wherein determining the frame type based on the input feature of each video frame in the video frame sequence comprises:

determining a frame type of each video frame in the video frame sequence based on an output of an encoding and decoding model, by inputting the input feature of each video frame in the video frame sequence into the encoding and decoding model.

5. The method according to claim 1, wherein the frame type comprises a key frame and a forward predictive encoded frame, and the method further comprises:

for any one target video frame in the video frame sequence, encoding the target video frame by using a method for intra-frame encoding, in a case that the frame type of the target video frame is the key frame; and encoding the target video frame based on a most recent key frame previous to the target video frame, in a case that the frame type of the target video frame is the forward predictive encoding frame.

6. The method according to claim 5, wherein the frame type further comprises a bidirectional predictive encoded frame, the method further comprises:

encoding the target video frame based on the most recent key frame previous to the target video frame and a most recent forward predictive encoded frame next to the target video frame, in a case that the frame type of the target video frame is the bidirectional predictive encoding frame; or, encoding the target video frame based on a most recent forward predictive encoded frame previous to the target video frame and the most recent forward predictive encoded frame next to the target video frame, in the case that the frame type of the target video frame is the bidirectional predictive encoding frame.

7. A method of model training for determining a frame type, comprising:

obtaining a sample frame sequence, wherein the sample frame sequence comprises at least one sample frame, and the sample frame is labeled with a target frame type;

obtaining an image feature of each sample frame by performing an image feature extraction on each sample frame in the sample frame sequences;

obtaining a feature similarity by comparing each sample frame with an adjacent sample frame in the sample frame sequence;

determining a predicted frame type of each sample frame using a model based on the feature similarity between each sample frame and the adjacent sample frame;

training the model based on a difference between the target frame type and the predicted frame type;

wherein determining the predicted frame type of each sample frame using the model based on the feature similarity between each sample frame and the adjacent sample frame comprises:

for any one target sample frame in the sample frame sequence, determining a feature similarity between the target sample frame and a previous adjacent sample frame, and a feature similarity between the target sample frame and a next adjacent sample frame;

determining an input feature of the target sample frame based on the feature similarity between the target sample frame and the previous adjacent sample frame and the feature similarity between the target sample frame and the next adjacent sample frame;

determining the predicted frame type based on an input feature of each sample frame in the sample frame sequence.

8. The method according to claim 7, wherein determining the predicted frame type based on the input feature of each sample frame in the sample frame sequence comprises:

for any one target sample frame in the sample frame sequence, determining the predicted frame type of the target sample frame based on a classification result of a classification model by inputting the input feature of the target sample frame into the classification model.

9. The method according to claim 7, wherein determining the predicted frame type based on the input feature of each sample frame in the sample frame sequence comprises:

determining the predicted frame type of each sample frame in the sample frame sequence based on an output of an encoding and decoding model, by inputting the input feature of each sample frame in the sample frame sequence into the encoding and decoding model.

10. An apparatus for determining a frame type based on a large model, comprising:

at least one processor; and a memory communicatively coupled to the at least one processor;

wherein the at least one processor is configured to:

obtain a video frame sequence from video data;

obtain a feature of each video frame by performing image feature extraction on each of video frames in the video frame sequence;

obtain a feature similarity by comparing each video frame with an adjacent video frame in the video frame sequence; and determine a frame type of each video frame in the video frame sequence based on the feature similarity between each video frame and the adjacent video frame;

wherein the at least one processor is configured to:

for any one target video frame in the video frame sequence, determine a feature similarity between the target video frame and a previous adjacent video frame, and a feature similarity between the target video frame and a next adjacent video frame;

determine an input feature of the target video frame based on the feature similarity between the target video frame and the previous adjacent video frame and the feature similarity between the target video frame and the next adjacent video frame; and determine the frame type based on an input feature of each video frame in the video frame sequence.

11. The apparatus according to claim 10, wherein the at least one processor is configured to:

take the feature similarity between the target video frame and the previous adjacent video frame as a first component;

take the feature similarity between the target video frame and the next adjacent video frame as a second component; and obtain the input feature of the target video frame by splicing the first component and the second component.

12. The apparatus according to claim 10, wherein the at least one processor is configured to:

for any one target video frame in the video frame sequence, determine a frame type of the target video frame based on a classification result of a classification model by inputting the input feature of the target video frame into the classification model.

13. The apparatus according to claim 10, wherein the at least one processor is configured to:

determine a frame type of each video frame in the video frame sequence based on an output of an encoding and decoding model, by inputting the input feature of each video frame in the video frame sequence into the encoding and decoding model.

14. The apparatus according to claim 10, wherein the frame type comprises a key frame and a forward predictive encoded frame, and wherein the at least one processor is configured to:

for any one target video frame in the video frame sequence, encode the target video frame by using a method for intra-frame encoding, in a case that the frame type of the target video frame is the key frame; and encode the target video frame based on a most recent key frame previous to the target video frame, in a case that the frame type of the target video frame is the forward predictive encoding frame.

15. The apparatus according to claim 14, wherein the frame type further comprises a bidirectional predictive encoded frame, the at least one processor is configured to:

encode the target video frame based on the most recent key frame previous to the target video frame and a most recent forward predictive encoded frame next to the target video frame, in a case that the frame type of the target video frame is the bidirectional predictive encoding frame; or, encode the target video frame based on a most recent forward predictive encoded frame previous to the target video frame and the most recent forward predictive encoded frame next to the target video frame, in the case that the frame type of the target video frame is the bidirectional predictive encoding frame.

16. An apparatus of model training for determining a frame type, comprising:

at least one processor; and a memory communicatively coupled to the at least one processor;

wherein the at least one processor is configured to perform claim 7.

* * * * *